(12) United States Patent
Ono (10) Patent No.: US 6,914,863 B2
(45) Date of Patent: Jul. 5, 2005

(54) DISC PLAYER AND METHOD OF PREVENTING LOCK OF ITS RESUME PLAY

(75) Inventor: Natsushi Ono, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 345 days.

(21) Appl. No.: 10/355,660

(22) Filed: Jan. 31, 2003

(65) Prior Publication Data

US 2003/0147322 A1 Aug. 7, 2003

(30) Foreign Application Priority Data

Feb. 1, 2002 (JP) ........................................ 2002-025144

(51) Int. Cl.$^7$ ................................................ G11B 7/00
(52) U.S. Cl. ................................ 369/53.12; 369/53.37
(58) Field of Search ........................... 369/30.1, 47.55, 369/53.12, 53.2, 53.21, 53.29, 53.37, 53.41, 53.42, 53.45

(56) References Cited

U.S. PATENT DOCUMENTS 5,365,502 A * 11/1994 Misono ........................ 369/18
5,463,601 A * 10/1995 Yanagisawa ............. 369/30.26
5,999,694 A * 12/1999 Yasuda et al. ................. 386/70

* cited by examiner

Primary Examiner—Paul W. Huber
(74) Attorney, Agent, or Firm—RatnerPrestia

(57) ABSTRACT

A disc player includes a reproducing parameter setting/extracting unit, a reproducing state monitor, a reproducing parameter storage unit for storing a reproducing position, a number-of-loadings counter, and a controller for controlling them. The controller, during reproducing, saves information related to a reproducing position into the storage unit, and initializes the counter. In turning on the power, the controller refers to the counter, interprets that contents in the storage unit are ineffective when the value of the counter is 0, and performs resume play when the value is not 0. Thus, a disc player for avoiding repeating of lock is provided. A similar effect can be obtained even when an effective flag for indicating whether contents of the reproducing parameter are effective or a just-after-loading flag for indicating whether it is just after reading the reproducing parameter is used instead of the counter.

20 Claims, 8 Drawing Sheets

DISC PLAYER AND METHOD OF PREVENTING LOCK OF ITS RESUME PLAY

TECHNICAL FIELD

The present invention relates to a disc player having a resume play function.

BACKGROUND ART

Digital versatile disc (DVD) video players recently become widespread. Especially, many DVD video players have a "resume play" function allowing a user to easily use the video players. When the user turns off the power during reproducing a DVD video and then turns on the power, thanks to this function, the video player reproduces the DVD video continuously from the position at the turn-off time. This function is realized as follows. The video player detects with software that the user turns off a power switch, and then stores information related to a reproducing position in a nonvolatile memory before turning off internal power. When the power switch is turned on later, the video player refers to the information and reproduces the video continuously from the position at the turn-off time.

When data on a disc having a scratch is reproduced, however, the reproducing is sometimes stopped. At this time, no key operation is accepted at all, so that the user often turns off the power against his/her will and then turns on the power again. When the resume play function works at this time, the video player tries to reproduce the data at the position having the scratch again, and stops again. Thus, the DVD video player having the conventional resume play function, in reproducing data on the disc having the scratch, stops at the same position even when the power is turned on again and again. The user cannot therefore operate the DVD video player at all, and the DVD video player comes into the locked state.

SUMMARY OF THE INVENTION

A disc player of the present invention includes the following elements:
 a disc reproducing engine for reproducing data on a disc;
 a reproducing parameter setting/extracting unit for extracting a parameter indicating a reproducing position in reproducing;
 a reproducing state monitor for monitoring whether or not the reproducing is proceeding;
 a reproducing parameter storage unit for storing the reproducing position even when the power is turned off;
 a nonvolatile memory constituting any one of a number-of-loadings counter for indicating how many times the parameter is loaded before it is saved, an effective flag for indicating whether or not the contents of the parameter are effective, and a just-after-loading flag for indicating that it is just after loading the parameter and no saving has been performed at all; and
 a controller for controlling the elements discussed above.

The controller inquires of the reproducing state monitor about progress of the reproducing every time the parameter is stored. When the reproducing is progressing, the controller saves a parameter extracted by the reproducing parameter setting/extracting unit into the reproducing parameter storage unit. When the power is turned on, the controller refers to the nonvolatile memory. When a value in the nonvolatile memory indicates "disapproval of resume play", the controller interprets that the contents in the reproducing parameter storage unit are ineffective. When the value indicates "approval of resume play", the controller commands the reproducing parameter setting/extracting unit to set the contents of the reproducing parameter storage unit into the disc reproducing engine.

DESCRIPTION OF THE PREFERRED EMBODIMENTS

Exemplary embodiments of the present invention will be described hereinafter with reference to the accompanying drawings. Same elements are denoted with the same reference numbers, and their detailed descriptions are omitted.

(Exemplary embodiment 1)

Figure 1:
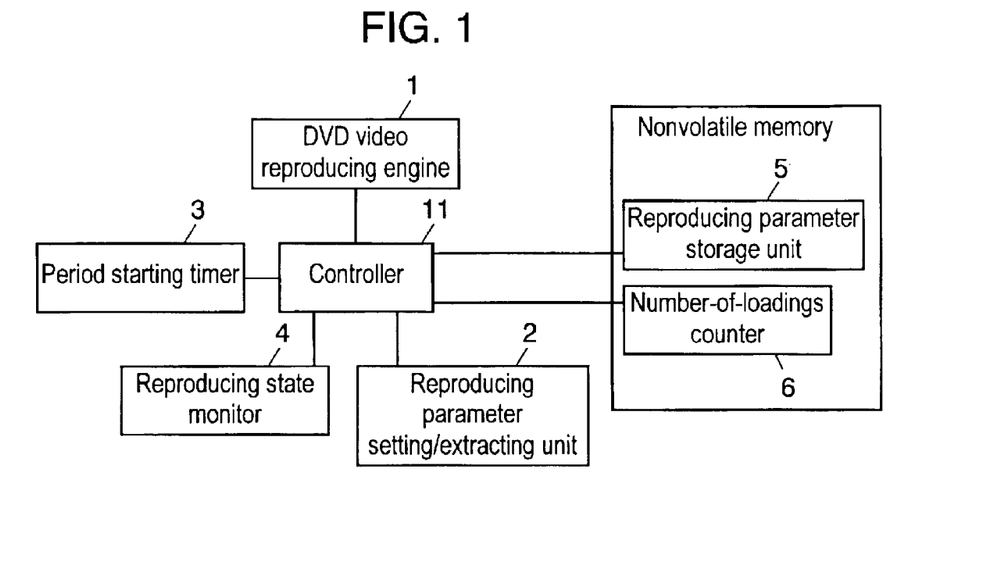
FIG. 1 is a block diagram showing configuration of a DVD video player in accordance with exemplary embodiment 1 of the present invention.

FIG. 1 is a block diagram showing configuration of a DVD video player in accordance with exemplary embodiment 1 of the present invention. DVD video reproducing engine (hereinafter, reproducing engine) 1 reproduces data on a DVD video disc. Reproducing parameter setting/extracting unit (hereinafter, setting/extracting unit) 2 extracts a parameter indicating a reproducing position in the reproducing. Period starting timer (hereinafter, timer) 3 is used to periodically start a process. Reproducing state monitor (hereinafter, monitor) 4 monitors whether or not the reproducing is proceeding. Reproducing parameter storage unit (hereinafter, storage unit) 5 stores the reproducing position even when the power is turned off. The contents in number-of-loadings counter (hereinafter, counter) 6 do not disappear even when the power is turned off, and counter 6 stores how many times the reproducing parameter is loaded before it is saved. Storage unit 5 and counter 6 are formed of nonvolatile memories, respectively.

Controller 11 receives information of storing timing of the reproducing parameter from timer 3, and inquires of monitor 4 about whether or not the reproducing is progressing. When the reproducing is progressing, controller 11 saves information related to the reproducing position extracted by setting/extracting unit 2 into storage unit 5. Controller 11 then initializes counter 6. When the power is turned on, controller 11 refers to counter 6. When the value of counter 6 is 0, controller 11 interprets that the contents in storage unit 5 are ineffective. When the value is not 0, controller 11 commands setting/extracting unit 2 to set the contents of storage unit 5 in reproducing engine 1 and performs the resume play.

Figure 2:
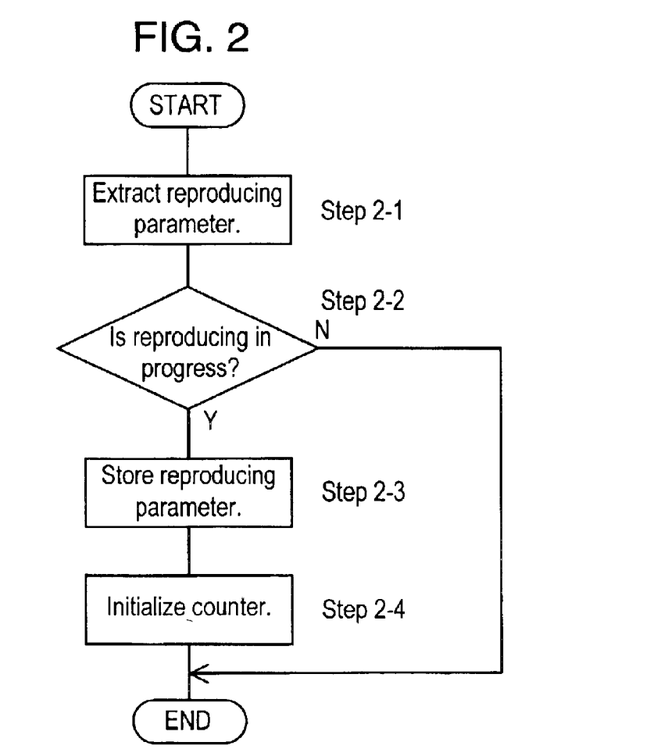
FIG. 2 is a flowchart showing an operation during reproducing by the DVD video player in accordance with exemplary embodiment 1.
Figure 3:
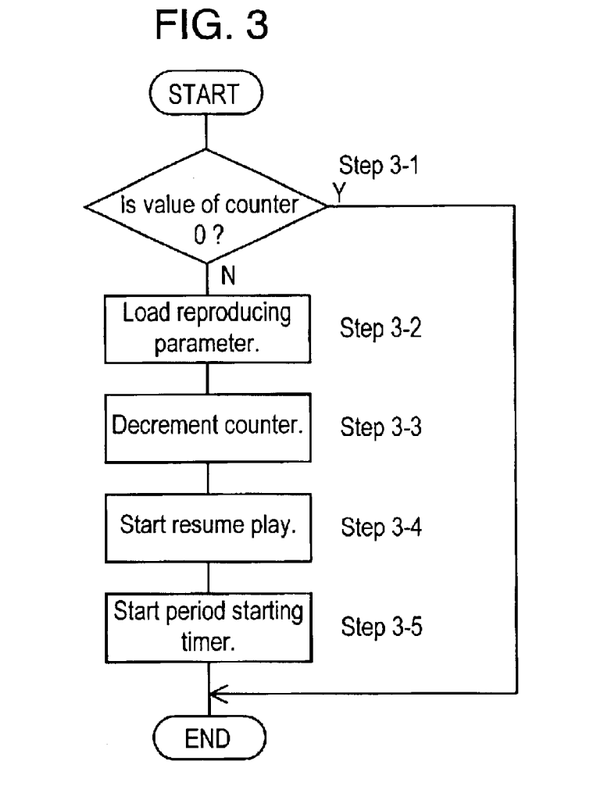
FIG. 3 is a flowchart showing an operation in turning on the DVD video player in accordance with exemplary embodiment 1.

Referring to FIG. 2 and FIG. 3, an operation of the DVD video player having the configuration discussed above is described. FIG. 2 is a flowchart showing an operation in storing reproducing parameters of the DVD video player. FIG. 3 is a flowchart showing an operation in turning on the power. These descriptions are performed on the assumption that reproducing on a DVD video disc is in progress. In other words, timer 3 periodically sends information "It is a storing time now, so store reproducing parameters," to controller 11. On receiving the information of the storing timing from timer 3, monitor 4 determines whether or not the reproducing is in progress, because monitor 4 has stored part (a reproducing time or sector position) of the reproducing parameters extracted by setting/extracting unit 2 in the previous informing time. An operation performed when timer 3 sends the information "It is a storing time now, so store reproducing parameters," to controller 11 is described hereinafter.

In step 2-1, controller 11 extracts reproducing parameters including reproducing position information with setting/extracting unit 2. The reproducing parameters include, for example, a title number or a chapter number during the reproducing, a presently selected language of a caption or language of sound, an angle number, and a position on the disc related to the present reproducing position.

In step 2—2, monitor 4 compares the now extracted reproducing parameters with reproducing time information and sector position information extracted by setting/extracting unit 2 at the previous informing time. The process proceeds to step 2-3 when the reproducing is in progress, and finishes when the reproducing is not in progress.

In step 2-3, controller 11 saves the reproducing parameters extracted by setting/extracting unit 2 into storage unit 5.

In step 2-4, controller 11 initializes counter 6. Here, 1 is written as the initial value.

FIG. 3 is a flowchart showing a resume play operation using the reproducing parameters stored in the DVD video player in turning on the power again.

In step 3-1, controller 11 refers to the contents in counter 6. Controller 11 finishes the process when the value of counter 6 is 0, and proceeds to step 3-2 when the value is not 0. In other words, value 0 indicates "disapproval of resume play".

In step 3-2, controller 11 reads the reproducing parameters from storage unit 5 and sets them in setting/extracting unit 2.

In step 3—3, controller 11 decrements the value of counter 6 and writes the decremented value. When the previous value is assumed to be 1, controller 11 writes 0 into counter 6. In other words, turning on of the power is repeated by the same number as the set initial value. If a cause such as a scratch in the disc disturbs the progress of the reproducing just after turning on the power, the value of counter 6 is decremented. Thus, the value of counter 6 becomes 0 after the turning on of the power is repeated.

In step 3-4, controller 11 commands reproducing engine 1 to start the reproducing based on the reproducing parameters set by setting/extracting unit 2. In other words, the reproducing is continued from the position at which data was reproduced when the power was turned off.

In step 3-5, controller 11 turns on timer 3 and starts the operation shown in FIG. 2 so as to allow the resume play also after the power is turned off later.

As discussed above, reproducing engine 1 performs the resume play based on the contents in storage unit 5 even when the power is turned off. When some kind of cause such as a scratch in the disc disturbs the progress of the reproducing, the value of counter 6 becomes 0 after repeating the turning on of the power, and the resume play is not executed. Therefore, a locked state is avoided where the video player tries to reproduce data on the same place again and again with the resume play function and thus does not accept any operation by a user.

The initial value of the number-of-loadings counter is set at 1 in embodiment 1; however, the initial value may be set at 3 or 5 as required.

(Exemplary embodiment 2)

Figure 4:
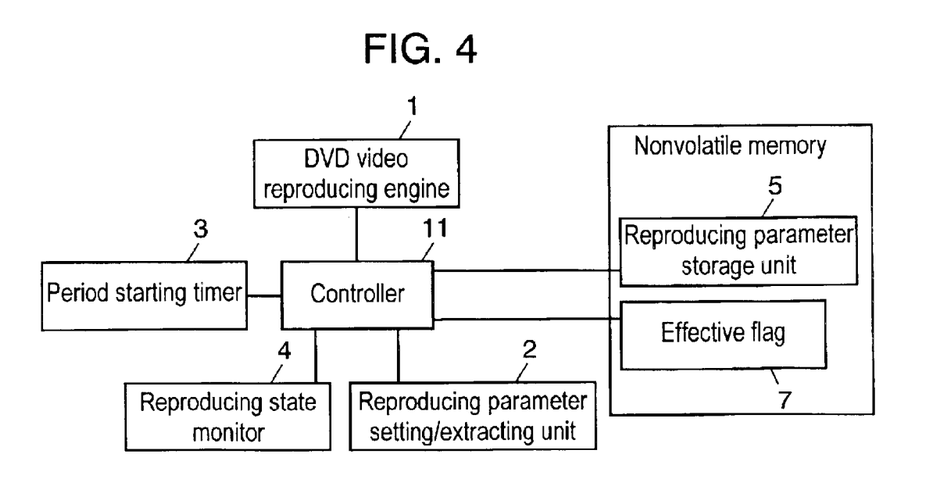
FIG. 4 is a block diagram showing configuration of a DVD video player in accordance with exemplary embodiment 2 of the present invention.
Figure 5:
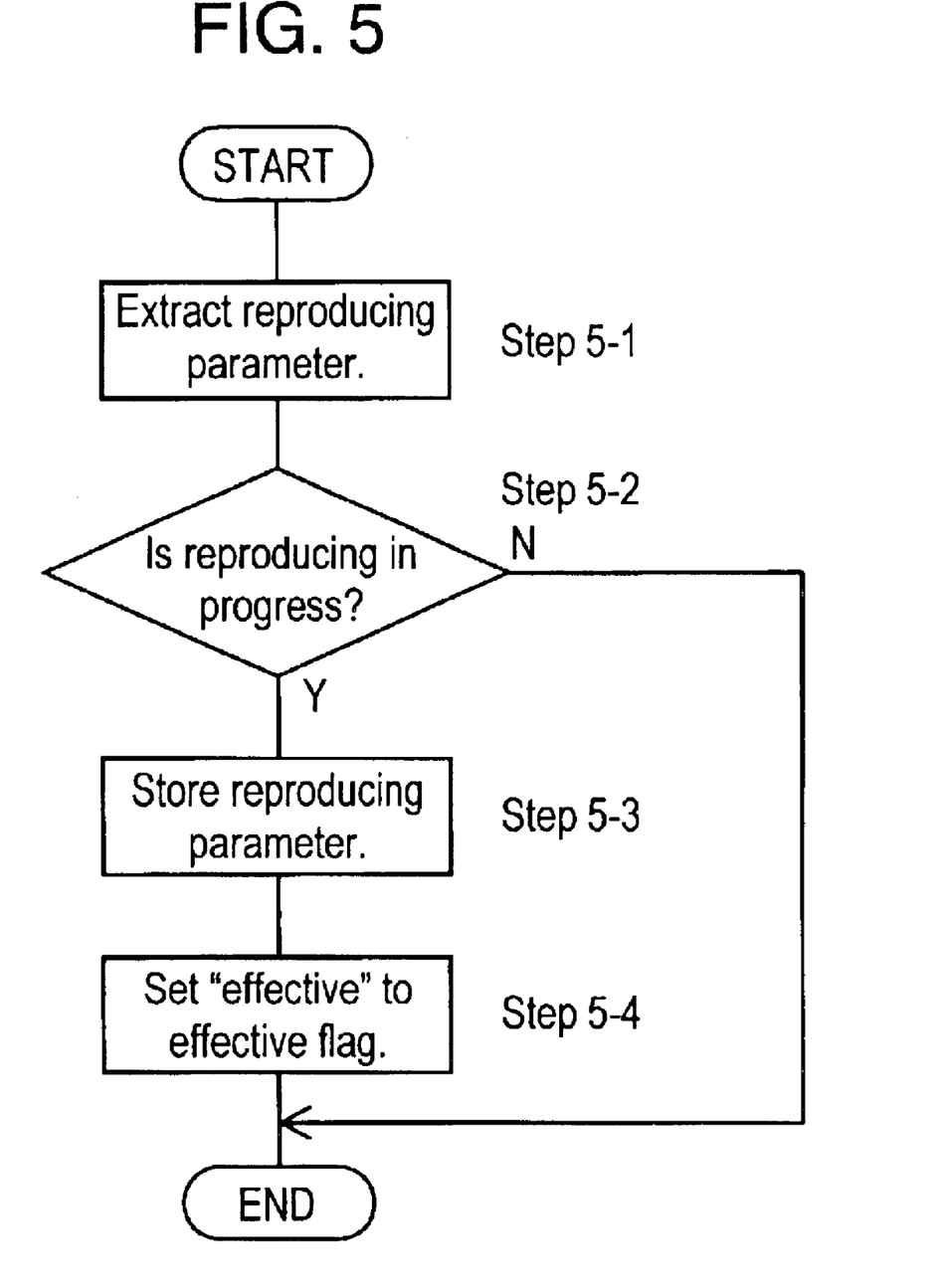
FIG. 5 is a flowchart showing an operation during reproducing of the DVD video player in accordance with exemplary embodiment 2.
Figure 6:
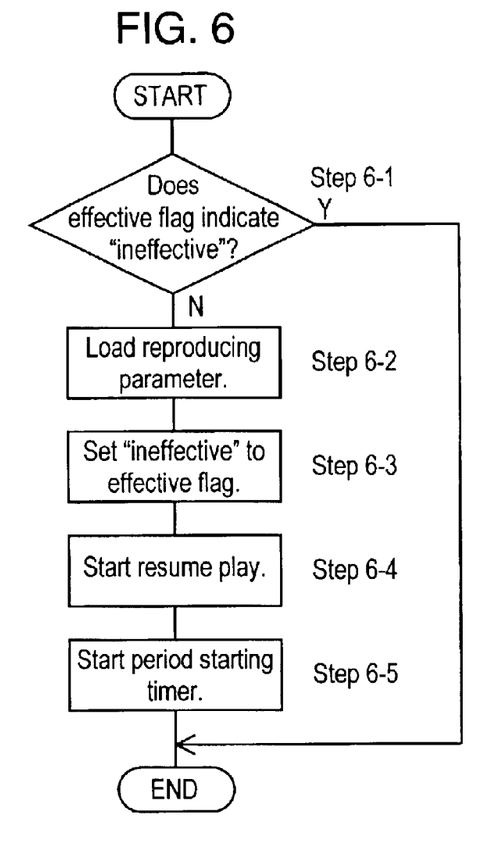
FIG. 6 is a flowchart showing an operation in turning on the power of the DVD video player in accordance with exemplary embodiment 2.

FIG. 4 is a block diagram showing configuration of a DVD video player in accordance with exemplary embodiment 2 of the present invention. FIG. 5 is a flowchart showing an operation during reproducing of the DVD video player. FIG. 6 is a flowchart showing an operation in turning on the power of the DVD video player.

Exemplary embodiment 2 differs from exemplary embodiment 1 in that the DVD video player of exemplary embodiment 2 has effective flag 7 instead of number-of-loadings counter 6. Effective flag 7 has contents that do not disappear even when the power is turned off, and indicates whether or not reproducing parameters are effective. Effective flag 7 is formed of a nonvolatile memory.

An operation of controller 11 thus differs from that in exemplary embodiment 1. Controller 11 receives information of storing timing of the reproducing parameters from period starting timer 3, and inquires of reproducing state monitor 4 about whether or not the reproducing is progressing. When the reproducing is progressing, controller 11 saves information related to the reproducing position extracted by reproducing parameter setting/extracting unit 2 into reproducing parameter storage unit 5. Controller 11 then writes the value indicating "effective" into effective flag 7. When the power is turned on, controller 11 refers to effective flag 7. When a stored value in effective flag 7 indicates "ineffective", controller 11 interprets that the contents in reproducing parameter storage unit 5 are ineffective. When the stored value indicates "effective", controller 11 commands reproducing parameter setting/extracting unit 2 to set the contents of reproducing parameter storage unit 5 into DVD video reproducing engine 1 and performs the resume play.

Referring to FIG. 5 and FIG. 6, an operation of the DVD video player having the configuration discussed above is described. These descriptions are performed on the assumption that reproducing on a DVD video disc is in progress, similarly to the DVD video player of embodiment 1. The other assumptions are similar to those of the DVD video player of embodiment 1.

Step 5-1 to step 5-3 are the same as step 2-1 to step 2-3 in embodiment 1. In step 5-1, controller 11 extracts reproducing parameters including reproducing position information with reproducing parameter setting/extracting unit (hereinafter, setting/extracting unit) 2. In step 5-2, reproducing state monitor (hereinafter, monitor) 4 compares the now extracted reproducing parameters with reproducing time information and sector position information extracted by setting/extracting unit 2 at the previous informing time. The process proceeds to step 5-3 when the reproducing is in progress, and finishes when the reproducing is not in progress. In step 5-3, controller 11 saves the reproducing parameters extracted by setting/extracting unit 2 into reproducing parameter storage unit (hereinafter, storage unit) 5.

In step 5-4, controller 11 writes a value indicating "effective" into effective flag 7.

In step 6-1, controller 11 refers to the contents of effective flag 7. Controller 11 finishes the process when the value of effective flag 7 indicates "ineffective", and proceeds to step 6-2 when the value does not indicate "ineffective". In other words, the value corresponding to "ineffective" indicates "disapproval of resume play".

In step 6-2, controller 11 reads the reproducing parameters from storage unit 5 and sets them in setting/extracting unit 2.

In step 6-3, controller 11 sets the value of effective flag 7 at the value corresponding to "ineffective". In other words, when the power is turned on again and just after that a cause such as a scratch in the disc disturbs progress of the reproducing, effective flag 7 continues to store the value corresponding to "ineffective".

In step 6-4, controller 11 commands DVD video reproducing engine (hereinafter, reproducing engine) 1 to start the reproducing based on the reproducing parameters set by setting/extracting unit 2. In other words, the reproducing is continued from the position at which data was reproduced when the power was turned off.

In step 6-5, controller 11 turns on period starting timer 3 and starts the operation shown in FIG. 5 so as to allow the resume play also after the power is turned off later.

As discussed above, reproducing engine 1 performs the resume play based on the contents in storage unit 5 even when the power is turned off. When some kind of cause such as a scratch in the disc disturbs the progress of the reproducing, the value of effective flag 7 is set at the value corresponding to "ineffective" by turning on the power again, and the resume play is not executed. Therefore, a locked state is avoided where the video player tries to reproduce data on the same place again and again with the resume play function and thus does not accept any operation by a user.

(Exemplary embodiment 3)

Figure 7:
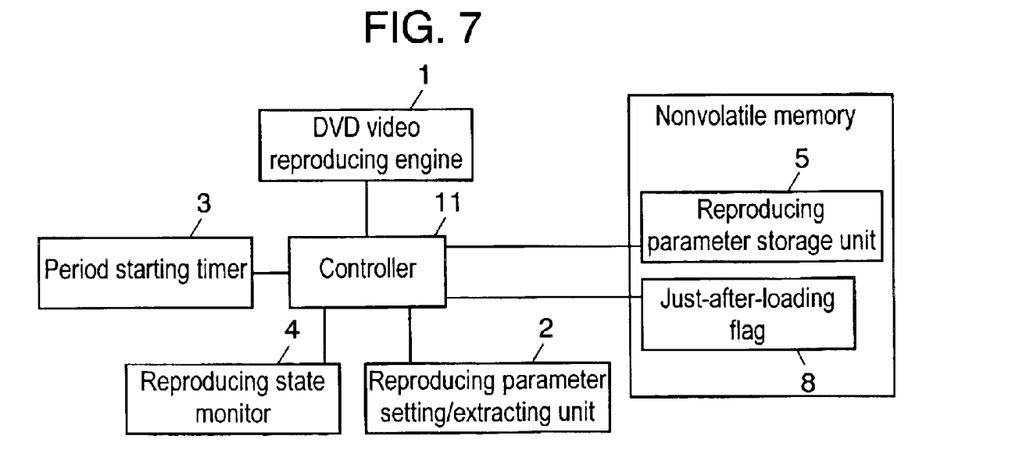
FIG. 7 is a block diagram showing configuration of a DVD video player in accordance with exemplary embodiment 3 of the present invention.
Figure 8:
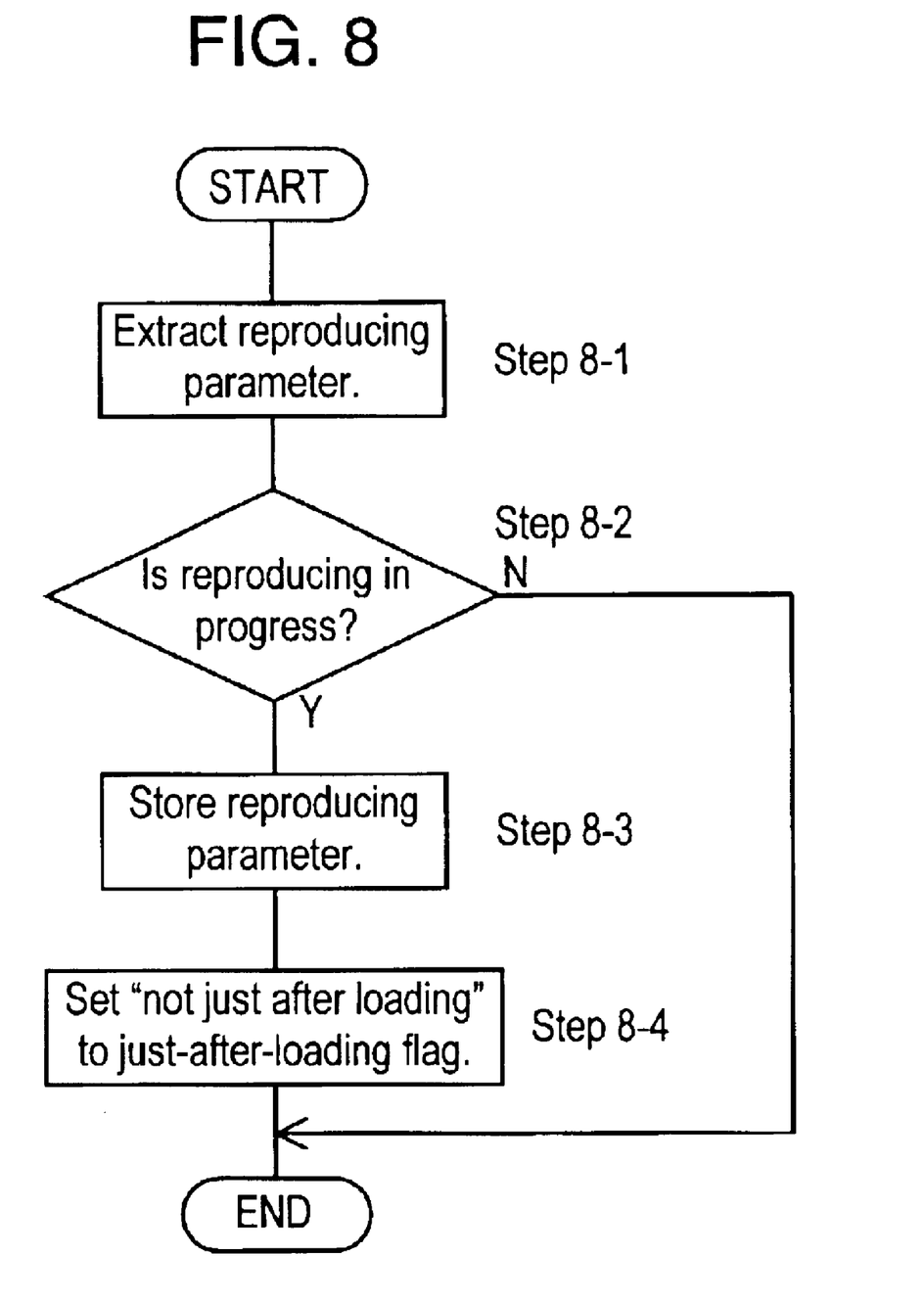
FIG. 8 is a flowchart showing an operation during reproducing of the DVD video player in accordance with exemplary embodiment 3.
Figure 9:
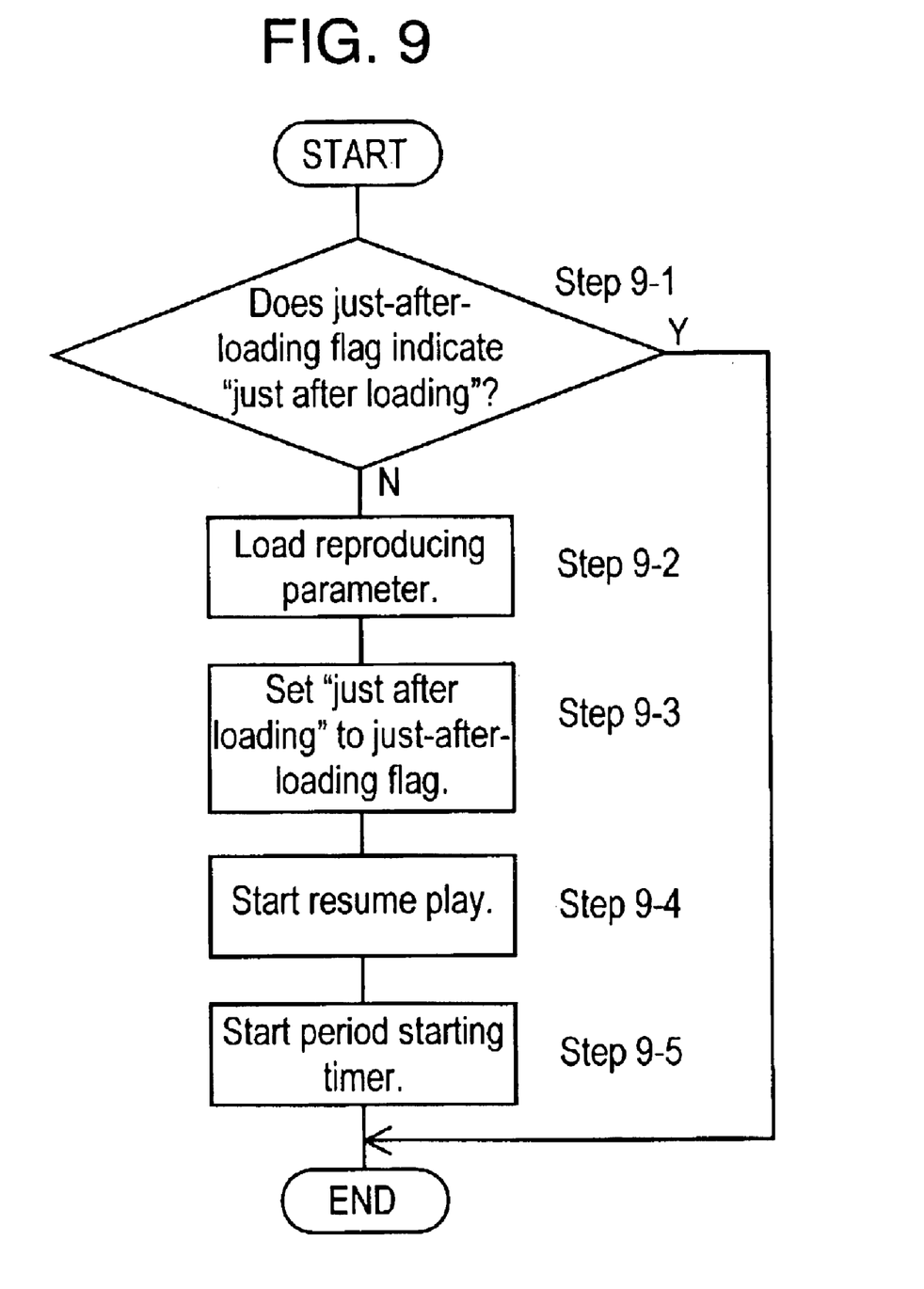
FIG. 9 is a flowchart showing an operation in turning on the DVD video player in accordance with exemplary embodiment 3.

FIG. 7 is a block diagram showing configuration of a DVD video player in accordance with exemplary embodiment 3 of the present invention. FIG. 8 is a flowchart showing an operation during reproducing of the DVD video player. FIG. 9 is a flowchart showing an operation in turning on the power of the DVD video player.

Exemplary embodiment 3 differs from exemplary embodiment 1 in that the DVD video player of exemplary embodiment 3 has just-after-loading flag 8 instead of number-of-loadings counter 6. Just-after-loading flag 8 has contents that do not disappear even when the power is turned off, and stores whether or not it is just after reading reproducing parameters. Just-after-loading flag 8 is formed of a nonvolatile memory.

An operation of controller 11 thus differs from that in exemplary embodiment 1. Controller 11 receives information of storing timing of the reproducing parameters from period starting timer 3, and inquires of reproducing state monitor 4 about whether or not the reproducing is progressing. When the reproducing is progressing, controller 11 saves information related to the reproducing position extracted by reproducing parameter setting/extracting unit 2 into reproducing parameter storage unit 5. Controller 11 then writes the value indicating "not just after loading" into just-after-loading flag 8. When the power is turned on, controller 11 refers to just-after-loading flag 8. When the value in just-after-loading flag 8 indicates "just after loading", controller 11 interprets that the contents in reproducing parameter storage unit 5 are ineffective. When the stored value do not indicate "just after loading", controller 11 commands reproducing parameter setting/extracting unit 2 to set the contents of reproducing parameter storage unit 5 into DVD video reproducing engine 1 and performs the resume play.

Referring to FIG. 8 and FIG. 9, an operation of the DVD video player having the configuration discussed above is described. These descriptions are performed on the assumption that reproducing on a DVD video disc is in progress, similarly to the DVD video player of embodiment 1. The other assumptions are similar to those of the DVD video player of embodiment 1.

Step 8-1 to step 8-3 are the same as step 2-1 to step 2-3 in embodiment 1. In step 8-1, controller 11 extracts reproducing parameters including reproducing position information with reproducing parameter setting/extracting unit (hereinafter, setting/extracting unit) 2. In step 8-2, reproducing state monitor (hereinafter, monitor) 4 compares the now extracted reproducing parameters with reproducing time information and sector position information extracted at the previous informing time. The process proceeds to step 8-3 when the reproducing is in progress, and finishes when the reproducing is not in progress. In step 8-3, controller 11 saves the reproducing parameters extracted by setting/ extracting unit 2 into reproducing parameter storage unit (hereinafter, storage unit) 5.

In step 8-4, controller 11 writes a value indicating "not just after loading" into just-after-loading flag 8.

In step 9-1, controller 11 refers to the contents of just-after-loading flag 8. Controller 11 finishes the process when the value of just-after-loading flag 8 indicates "just after loading", and proceeds to step 92 when the value does not indicate "just after loading". In other words, the value corresponding to "just after loading" indicates "disapproval of resume play".

In step 9-2, controller 11 reads the reproducing parameters from storage unit 5 and sets them in setting/extracting unit 2.

In step 9-3, controller 11 writes the value corresponding to "just after loading" as the value of just-after-loading flag 8. In other words, when the power is turned on again and just after that a cause such as a scratch in the disc disturbs progress of the reproducing, the value of just-after-loading flag 8 indicates "just after loading" on turning on the power again.

In step 9-4, controller 11 commands DVD video reproducing engine (hereinafter, reproducing engine) 1 to start the reproducing based on the reproducing parameters set by setting/extracting unit 2. In other words, the reproducing is continued from the position at which data was reproduced when the power was turned off.

In step 9-5, controller 11 turns on period starting timer 3 and starts the operation shown in FIG. 8 so as to allow the resume play also after the power is turned off later.

As discussed above, reproducing engine 1 performs the resume play based on the contents in storage unit 5 even when the power is turned off. When some kind of cause such as a scratch in the disc disturbs the progress of the reproducing, the value of just-after-loading flag 8 is set at the value corresponding to "just after loading" by turning on the power again, and the resume play is not executed. Therefore, a locked state is avoided where the video player tries to reproduce data on the same place again and again with the resume play function and thus does not accept any operation by a user.

(Exemplary embodiment 4)

Figure 10:
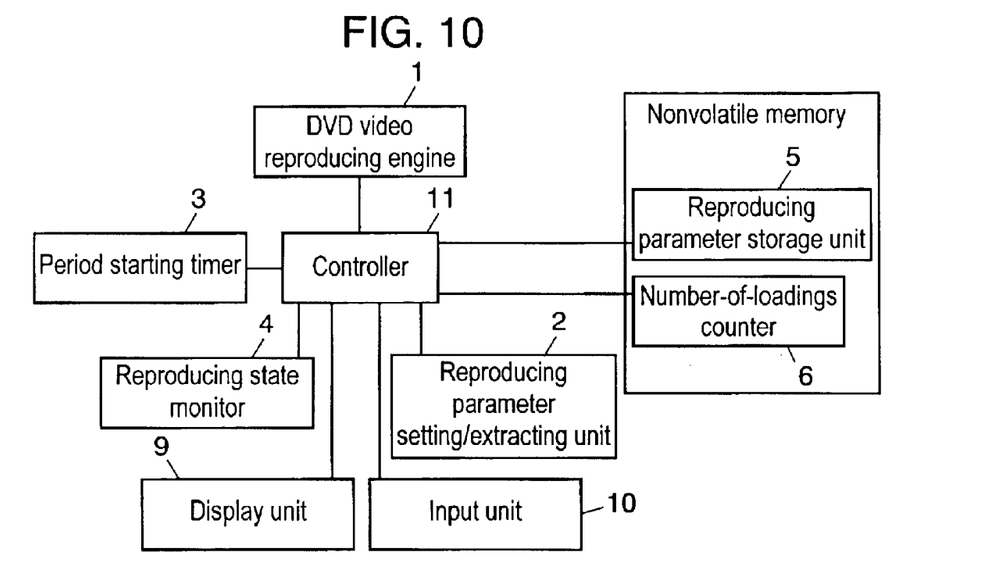
FIG. 10 is a block diagram showing configuration of a DVD video player in accordance with exemplary embodiment 4 of the present invention.
Figure 11:
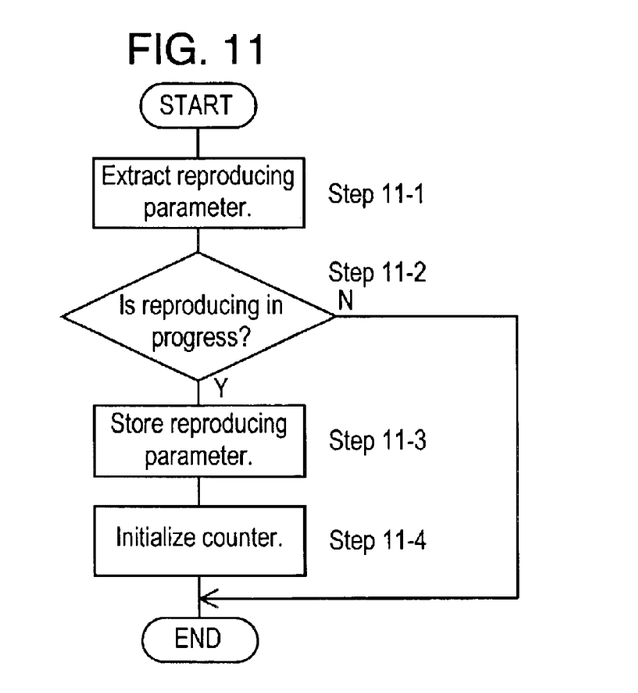
FIG. 11 is a flowchart showing an operation during reproducing of the DVD video player in accordance with exemplary embodiment 4.
Figure 12:
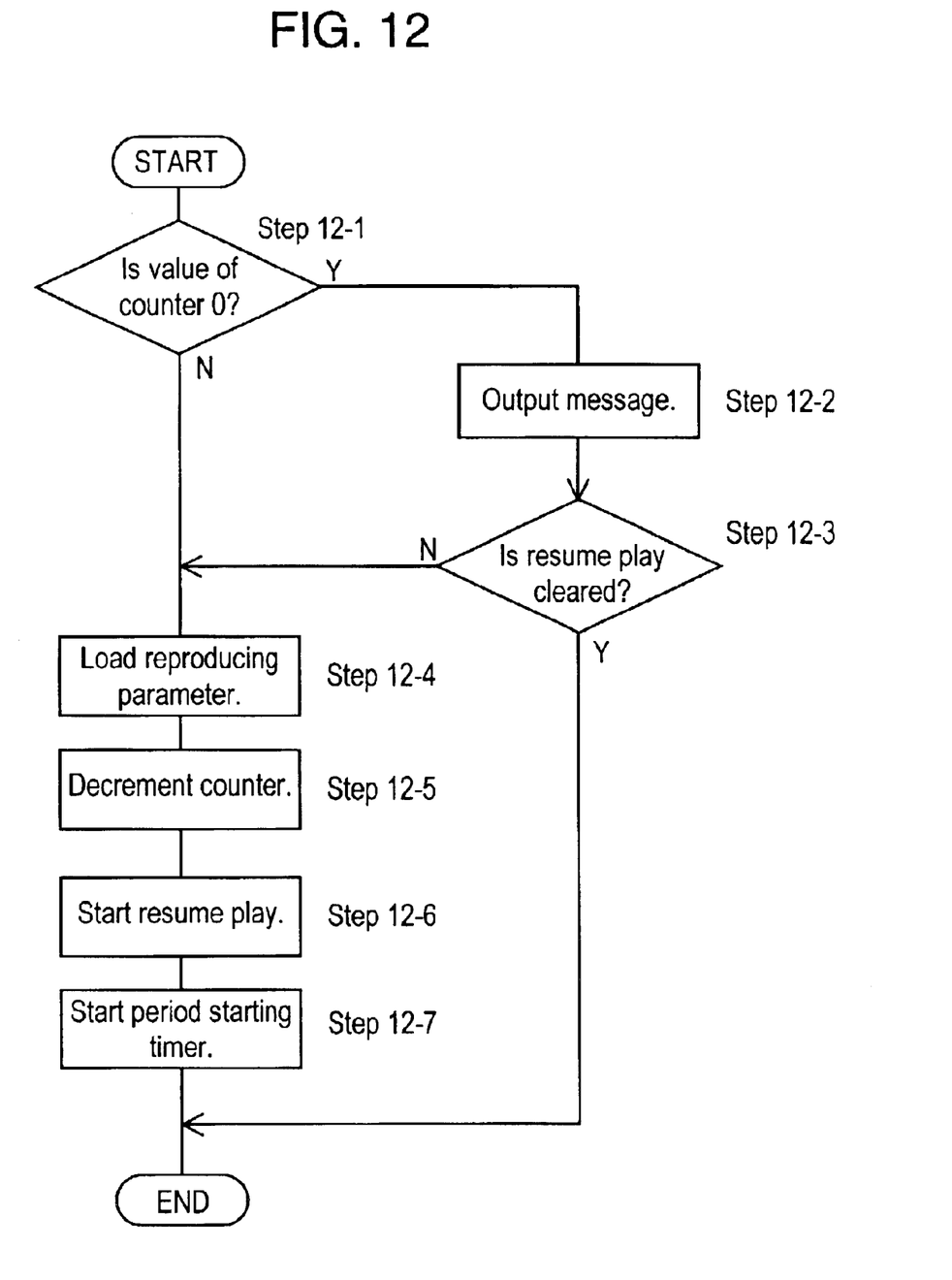
FIG. 12 is a flowchart showing an operation in turning on the power of the DVD video player in accordance with exemplary embodiment 4.

FIG. 10 is a block diagram showing configuration of a DVD video player in accordance with exemplary embodiment 4 of the present invention. FIG. 11 is a flowchart showing an operation during reproducing of the DVD video player. FIG. 12 is a flowchart showing an operation in turning on the power of the DVD video player.

Exemplary embodiment 4 differs from exemplary embodiment 1 in that the DVD video player of exemplary embodiment 4 further has information unit 9 and input unit 10. Information unit 9 informs a user of a message for inquiring of a user about whether or not to execute the resume play. In response to the informed message, the user inputs from input unit 10 a command indicating whether or not to execute the resume play.

An operation of controller 11 thus differs from that in exemplary embodiment 1. Controller 11 receives information of storing timing of the reproducing parameters from period starting timer (hereinafter, timer) 3, and inquires of reproducing state monitor (hereinafter, monitor) 4 about whether or not the reproducing is progressing. When the reproducing is progressing, controller 11 saves information related to the reproducing position extracted by reproducing parameter setting/extracting unit (hereinafter, setting/ extracting unit) 2 into reproducing parameter storage unit (hereinafter, storage unit) 5. Controller 11 then initializes number-of-loadings counter (hereinafter, counter) 6. When the power is turned on, controller 11 refers to counter 6. When the value of counter 6 is 0, controller 11 interprets that the contents in storage unit 5 can be ineffective. Controller 11 informs a user, with information unit 9, of a message for inquiring of a user about whether or not to execute the resume play. Controller 11 executes the resume play when the user instructs execution of the resume play from input unit 10, and commands DVD video reproducing engine (hereinafter, reproducing engine) 1 not to execute the resume play when the user does not instruct the execution of the resume play. When the value of counter 6 is not 0, controller 1 commands setting/extracting unit 2 to set the contents of storage unit 5 in reproducing engine 1 and performs the resume play.

Referring to FIG. 11 and FIG. 12, an operation of the DVD video player having the configuration discussed above is described. These descriptions are performed on the assumption that reproducing on a DVD video disc is in progress, similarly to the DVD video player of embodiment 1. The other assumptions are similar to those of the DVD video player of embodiment 1.

Step 11-1 to step 11-4 are the same as step 2-1 to step 2-4 in embodiment 1. In step 11-1, controller 11 extracts reproducing parameters including reproducing position information with setting/extracting unit 2. In step 11-2, monitor 4 compares the now extracted reproducing parameters with reproducing time information and sector position information extracted by setting/extracting unit 2 at the previous informing time. The process proceeds to step 11-3 when the reproducing is in progress, and finishes when the reproducing is not in progress. In step 11-3, controller 11 saves the reproducing parameters extracted by setting/extracting unit 2 into storage unit 5. In step 11-4, controller 11 initializes counter 6. Here, 1 is written as the initial value.

In step 12-1, controller 11 refers to the contents in counter 6. Controller 11 proceeds to step 12-2 when the value of counter 6 is 0, and proceeds to step 12-4 when the value is not 0. In other words, value 0 indicates "disapproval of resume play".

In step 12-2, controller 11 has information unit 9 to inform a user of the message "Do you clear resume play?".

In step 12-3, the user inputs a response to the message from input unit 10. Controller 11 finishes the process when the input by the user indicates "Clear", and proceeds to step 12-4 when the input does not indicate "Clear".

In step 12-4, controller 11 reads the reproducing parameters from storage unit 5 and sets them in setting/extracting unit 2.

In step 12-5, controller 11 decrements the value of counter 6 and writes the decremented value. When the value is 0 already, controller 11 does not decrement the value. Here, it is assumed that 1 is written. At this time, controller 11 writes 0 into counter 6. In other words, turning on of the power is repeated by the same number as the set initial value. If a cause such as a scratch in the disc disturbs progress of the reproducing just after the turning on, the value of counter 6 is decremented. Thus, the value of counter 6 becomes 0 after the turning on of the power is repeated.

In step 12-6, controller 11 commands reproducing engine 1 to start the reproducing based on the reproducing parameters set by setting/extracting unit 2. In other words, the reproducing is continued from the position at which data was played back when the power was turned off.

In step 12-7, controller 11 turns on timer 3 and starts the operation shown in FIG. 11 so as to allow the resume play also after the power is turned off later.

As discussed above, reproducing engine 1 performs the resume play based on the contents in storage unit 5 even when the power is turned off. When some kind of cause such as a scratch in the disc disturbs the progress of the reproducing, the value of counter 6 becomes 0 after repeating the turning on of the power. Controller 11 makes the user determine whether or not to execute the resume play. Therefore, a locked state is avoided where the video player tries to reproduce data on the same place again and again with the resume play function and thus does not accept any operation by a user.

Information unit 9 is formed of a display device such as a liquid crystal panel or a light emitting diode (LED) indicator, or an alarm or a messenger for synthesizing sounds.

In embodiment 4, information unit 9 and input unit 10 are added to the configuration of embodiment 1. However, they may be added to the configuration of embodiment 2 or embodiment 3. In this configuration, a user determines whether or not to execute the resume play.

The video player of every embodiment discussed above generates the storing timing of reproducing parameters with a period starting timer. However, the storing of the reproducing parameters may be started at about 0.5 VOBU (Video Object Unit). Here, VOBU is a reproducing unit defined in a DVD video standard.

In every embodiment discussed above, a DVD video player was described as the video disc player. However, the present invention is not limited to the DVD video player but can be applied to any device for reproducing data on a disc.

What is claim is:

1. A disc player for performing resume play comprising:
a disc reproducing engine for reproducing data on a disc;
a reproducing parameter setting/extracting unit for extracting a parameter indicating a reproducing position in reproducing;
a reproducing state monitor for monitoring whether the reproducing is proceeding;
a reproducing parameter storage unit for storing the reproducing position even when the power is turned off;
a nonvolatile memory constituting any one of a number-of-loadings counter for indicating how many times the parameter is loaded before the parameter is saved, an effective flag for indicating whether contents of the parameter are effective, and a just-after-loading flag for indicating that it is just after loading the reproducing parameter and before any saving; and
a controller for inquiring of said reproducing state monitor about progress of the reproducing every time the reproducing parameter is stored, saving the parameter extracted by said reproducing parameter setting/extracting unit into said reproducing parameter storage unit when the reproducing is progressing, referring to said nonvolatile memory when the power is turned on, interpreting that contents of said reproducing parameter storage unit are ineffective when a value in said nonvolatile memory indicates "disapproval of resume play", and commanding said reproducing parameter setting/extracting unit to set the contents of said reproducing parameter storage unit into said disc reproducing engine when the value in said nonvolatile memory indicates "approval of resume play".

2. A disc player according to claim 1 further comprising a period starting timer for informing said controller of storing timing of the parameter.

3. A disc player according to claim 1, wherein
said nonvolatile memory forms the number-of-loadings counter, and "disapproval of resume play" is indicated when the value in the number-of-loadings counter is 0.

4. A disc player according to claim 3, wherein
said controller initializes the number-of-loadings counter when the reproducing is progressing.

5. A disc player according to claim 4, wherein
said controller decrements the value in the number-of-loadings counter every time said reproducing state monitor monitors that proceeding of reproducing on a disc is disturbed.

6. A disc player according to claim 4, wherein
an initial value in the number-of-loadings counter is 1.

7. A disc player according to claim 1, wherein
said nonvolatile memory forms the effective flag, and
"disapproval of resume play" is indicated when the value of the effective flag indicates ineffectiveness.

8. A disc player according to claim 7, wherein
said controller writes a value indicating effectiveness of the parameter when the reproducing is progressing.

9. A disc player according to claim 1, wherein
said nonvolatile memory forms the just-after-loading flag, and
"disapproval of resume play" is indicated when the value of the just-after-loading flag indicates that it is just after loading.

10. A disc player according to claim 1 further comprising:
an information unit for informing a user of a message for confirming whether or not to clear the resume play; and
an input unit used for inputting approval or disapproval of clearing of the resume play.

11. A disc player according to claim 1, wherein
the disc is a DVD.

12. A method of preventing lock of resume play in a disc player, said method comprising the steps of:
inquiring about whether reproducing is in progress;
extracting a parameter indicating a reproducing position in reproducing;

saving the parameter;

storing any one of a value of a number-of-loadings counter for indicating how many times the reproducing parameter is loaded before the reproducing parameter is saved into a nonvolatile memory, a value of an effective flag for indicating whether contents of the parameter are effective, and a value of a just-after-loading flag for indicating that it is just after loading the reproducing parameter and before any saving;

referring to the nonvolatile memory when power is turned on;

interpreting that the parameter is ineffective when a value in the nonvolatile memory indicates "disapproval of resume play"; and setting the parameter in a disc reproducing engine for reproducing data on the disc when the value in the nonvolatile memory indicates "approval of resume play".

13. A method of preventing lock according to claim 12, wherein the nonvolatile memory stores the value of the number-of-loadings counter, and "disapproval of resume play" is indicated when the value of the number-of-loadings counter is 0.

14. A method of preventing lock according to claim 13, further comprising the step of initializing the number-of-loadings counter when the reproducing is in progress.

15. A method of preventing lock according to claim 13, further comprising the step of decrementing the value of the number-of-loadings counter every time a non-progress state of the reproducing on the disc is monitored.

16. A method of preventing lock according to claim 13, wherein the initial value of the number-of-loadings counter is 1.

17. A method of preventing lock according to claim 12, wherein the nonvolatile memory stores the value of the effective flag, and "disapproval of resume play" is indicated when the value of the effective flag indicates ineffectiveness.

18. A method of preventing lock according to claim 17, further comprising the step of writing a value indicating effectiveness of the reproducing parameter into the effective flag when the reproducing is in progress.

19. A method of preventing lock according to claim 12, wherein the nonvolatile memory stores the value of the just-after-loading flag, and "disapproval of resume play" is indicated when the value of the just-after-loading flag indicates that it is just after loading.

20. A method of preventing lock according to claim 12, further comprising the steps of informing a user of a message for confirming whether or not to clear the resume play; and inputting one of approval and disapproval of clearing of the resume play.

* * * * *